US010226061B2

(12) United States Patent
Lillevang et al.

(10) Patent No.: US 10,226,061 B2
(45) Date of Patent: Mar. 12, 2019

(54) MICROBIAL OXYGEN ABSORBER

(71) Applicant: ARLA FOODS AMBA, Viby J (DK)

(72) Inventors: Soren K. Lillevang, Viby J (DK);
Grith Mortensen, Viby J (DK); Mette
Nortoft Kristensen, Viby J (DK);
Henrik Skou Pedersen, Viby J (DK);
Torben Lohse Friis, Viby J (DK);
Niels Kristian Sorensen, Viby J (DK)

(73) Assignee: ARLA FOODS AMBA, Viby J (DK)

( * ) Notice: Subject to any disclaimer, the term of this patent is extended or adjusted under 35 U.S.C. 154(b) by 684 days.

(21) Appl. No.: 14/307,979

(22) Filed: Jun. 18, 2014

(65) Prior Publication Data
US 2014/0363551 A1 Dec. 11, 2014

Related U.S. Application Data

(62) Division of application No. 11/602,328, filed on Nov. 21, 2006.
(Continued)

(30) Foreign Application Priority Data

Nov. 21, 2005 (DK) .................................. 2005 01623

(51) Int. Cl.
A23L 3/3436 (2006.01)
A23L 3/3571 (2006.01)
(Continued)

(52) U.S. Cl.
CPC ............ A23L 3/3571 (2013.01); A23C 19/10 (2013.01); A23L 3/3436 (2013.01); A23L 3/3463 (2013.01);
(Continued)

(58) Field of Classification Search
CPC ..... A23L 3/3571; A23L 3/3436; A23C 19/10; B65B 25/001; B65D 81/266
(Continued)

(56) References Cited

U.S. PATENT DOCUMENTS 2,950,977 A 8/1960 Silliker et al.
2,970,922 A 2/1961 Ereckson et al.
(Continued)

FOREIGN PATENT DOCUMENTS

EP 0 384 541 A 8/1990
RU 2004115325 3/2005
WO WO 01/52668 A 7/2001

OTHER PUBLICATIONS

Chopin, M C et al., "Insertion and Amplification of Foreign Genes in the *Lactococcus lactis* subsp. *lactis* Chromosome," *Appl. Environ. Microbiol.* 1989, 55(7):1769.
(Continued)

Primary Examiner — Helen F Heggestad
(74) Attorney, Agent, or Firm — Finnegan, Henderson, Farabow, Garrett & Dunner, LLP

(57) ABSTRACT

Oxygen is a major quality-deteriorating factor with respect to many food products in that it may cause the growth of molds and the development of rancid off-flavors, which reduce the quality or shelf life of many food products. The present invention provides an improved food packaging and a method for prolonging the shelf life and quality of packaged foods by packaging the food in a packaging material together with a microbial oxygen absorber, such as *Lactococcus* spp., *Streptococcus* spp., *Lactobacillus* spp., *Leuconostoc* spp., *Brevibacterium* spp., *Propionibacterium* spp., and *Bifidobacterium* spp.

10 Claims, 5 Drawing Sheets

Related U.S. Application Data

(60) Provisional application No. 60/738,031, filed on Nov. 21, 2005.

(51) Int. Cl.
*A23L 3/3463* (2006.01)
*B65D 81/26* (2006.01)
*A23C 19/10* (2006.01)
*B65B 25/00* (2006.01)

(52) U.S. Cl.
CPC .......... *B65B 25/001* (2013.01); *B65D 81/266* (2013.01); *A23V 2002/00* (2013.01); *A23Y 2240/41* (2013.01)

(58) Field of Classification Search
USPC .................................. 426/52, 106, 465, 454
See application file for complete search history.

(56) References Cited

U.S. PATENT DOCUMENTS

| | | |
|---|---|---|
| 2,987,403 A | 6/1961 | Tupper |
| 4,996,073 A | 2/1991 | Copeland et al. |
| 5,298,264 A | 3/1994 | Edens et al. |
| 5,811,142 A | 9/1998 | DelDuca et al. |
| 2001/0033878 A1 | 10/2001 | Geppel et al. |
| 2002/0081712 A1 | 6/2002 | Kringelum et al. |
| 2004/0156952 A1 | 8/2004 | Domingues et al. |
| 2004/0249129 A1 | 12/2004 | Daniel et al. |

OTHER PUBLICATIONS

Cutter et al., "Application of Edible Coating on Muscle Foods." CRC Press LLC, 2002, Chapter 18.

Vermeiren, L. et al., "Oxygen, Ethylene and Other Scavengers" in Novel Food Packaging Techniques (R. Ahvenainen ed., CRC Press, Woodhead Publishing Ltd., Cambridge, England 2003), pp. 22-49.

MICROBIAL OXYGEN ABSORBER

This is a division of application Ser. No. 11/602,328, filed Nov. 21, 2006, now abandoned, and claims the priority of Danish Patent Application No. PA 2005/01623, filed on Nov. 21, 2005, and claims the benefit of U.S. Provisional Application No. 60/738,031, filed on Nov. 21, 2005, each of which is incorporated herein by reference in its entirety.

FIELD OF THE INVENTION

The present invention relates to the fields of packaging materials, microbiology and methods for preserving food products.

BACKGROUND OF THE INVENTION

A wide range of methods is used for preserving food products. Among these methods are the use of antimicrobial preservatives, e.g. chemicals such as nitrate, sulphur dioxide, benzoic acid, and proteins such as nisin and pediocin. Another method is the addition of an antioxidant such as ascorbic acid, citric acid and tocopherols. Antioxidants prevent oxidation of foods, which would otherwise result in rancidity and discoloration.

EP 0 092 183 B1 discloses a method for preservation of food by providing a culture in the food containing lactose, which generates a bacterial spoilage inhibitory substance.

WO 01/52668 discloses porphyrin-containing lactic acid bacteria and their use for reducing oxygen content in a food product.

Oxygen is a major quality-deteriorating factor with respect to many food products. Oxygen may cause growth of molds and development of rancid off-flavors, which subsequently reduce the quality and shelf life of many food products. It is therefore desirable to reduce the oxygen content in the air having contact with the food product within the packaging. Packaging in modified atmospheres with low residual oxygen has been introduced in order to reduce the quality changes associated with the presence of oxygen.

Presently the residual oxygen level in packaged foods may be reduced by means of the following approaches:

Repeating vacuum and gas flushing cycles to reduce the residual oxygen content. This method is expensive both with respect to amounts of gas used and time used for the gas flushing cycles. Hence, significant increases in packaging costs result.

Use of a chemical oxygen absorber. The present systems utilize one or more of the following concepts: iron powder oxidation, ascorbic acid oxidation, photosensitive dye oxidation, enzymatic oxidation (e.g. glucose oxidase and alcohol oxidase), unsaturated fatty acids (e.g. oleic acid or linolenic acid), or immobilized yeast on a solid material (Vermeiren et al., 1999, 2003). Most of the currently commercially available chemical oxygen absorbers are based on iron powder oxidation. Additionally, enzymatic removal of oxygen has been proposed as a promising technique (Vermeiren at al., 1999, 2003). The oxygen absorbing materials are incorporated into labels, sachets, or into the packaging material. The disadvantages of these systems are that the absorber efficiency is often low and the time used before the system is activated is unacceptably long. Furthermore, legislative aspects in relation to food products in some cases hinder the use of these systems.

Food products packaged in vacuum or with a modified atmosphere are susceptible to packaging defects, and oxygen enters the packaging on opening of the package during use. Furthermore, obtaining low residual oxygen content in the packaging process is time-consuming and costly.

Thus, there is a need within the food industry to find alternative or supplementary ways of reducing the residual oxygen content in packaged foods. Such alternative ways of reducing residual oxygen content must comply with food regulatory legislation as well as with consumer preferences.

SUMMARY OF THE INVENTION

Accordingly, the present invention provides a method for preservation of a food product by packaging said food in a packaging material together with a microbial oxygen absorber.

Thus, in one aspect the invention is related to a food product packaged in a packaging material together with a microbial oxygen absorber.

The present invention also provides growth media containing microorganisms capable of reducing the oxygen content in the package. The microbial oxygen absorber is preferably microorganisms consuming oxygen with little or no concomitant production of carbon dioxide and organic acids. An example of such a microorganism is a *Lactococcus lactis* strain, which uses oxygen and produces limited amounts of diacetyl and acetoin.

In a preferred embodiment of the invention the microbial oxygen absorber is applied to the surface of the food. In another preferred embodiment of the invention the microbial oxygen absorber is applied to a sachet, label, capsule, or as freeze-dried pellets placed within the package in a way to minimize transfer of said microbial oxygen absorber onto said food. In another embodiment the microbial oxygen absorber is incorporated into the packaging material, e.g. in a laminated structure or a coating. In another aspect the present invention provides a food product, which has a low content of oxygen within the packaging even after the consumer has repeatedly opened the packaging.

One advantage of the present invention is that increased packaging machine speed can be used because the residual oxygen at the time of packaging can be increased. Another advantage is that the oxygen content within the food packaging can be repeatedly decreased after opening and closing the packaging.

DETAILED DESCRIPTION OF THE INVENTION

Figure 1A:
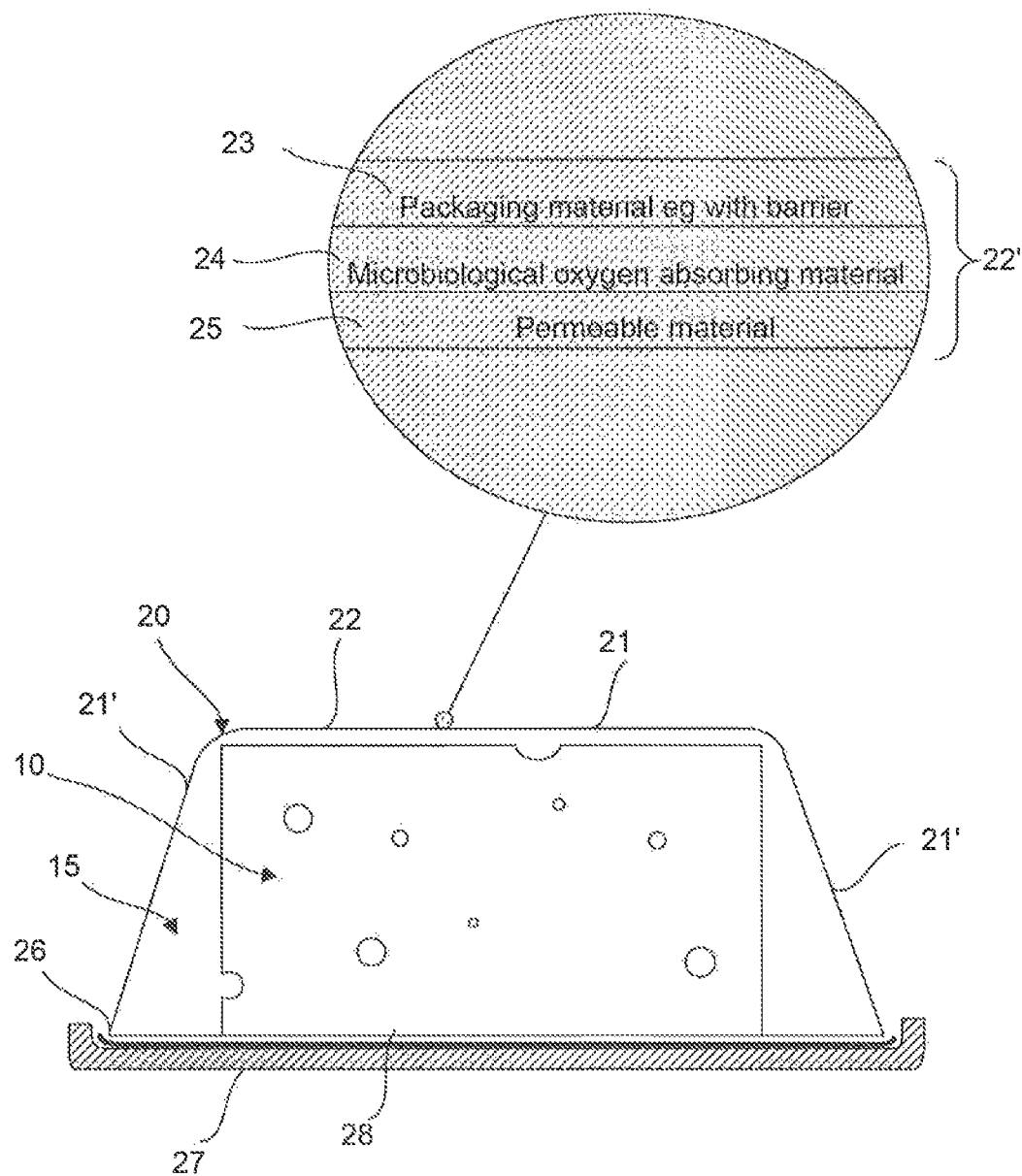
FIG. 1*a* is a schematic illustration of the incorporation of a microbial oxygen absorber into a packaging material for food.

FIG. 1a shows a perishable food product 10 stored within a packaging 20 comprising a shaped upper part 22 formed from a layered material 22' and having a foil 28 bonded to a peripheral rim 26 thereof. As shown, a tray-like bottom part 27 may be snapped on to the rim 26.

The layered material 22' of the upper part 22 may comprise three layers 23, 24, 25, with an upper or outer layer 23 defining a barrier adapted to prevent in a conventional manner entry into the packaging 20 of air that would lead to a rapid decay of the food product 10 and thus reduce the period in which the product 10 will remain fresh prior to opening of the packaging 20 by removal of the foil 28. The central or inner layer 24 of layered material 22' is defined by or includes a microbiological oxygen absorbing material to be discussed in closer details below. A further layer 25 defines a surface of the packaging 20 facing the food product 10, and layer 25 is permeable to allow gas communication between layer 24 and the inside of packaging 20.

Preferably, the material for the upper layer 23 and for the foil 28 comprises a PE layer to ensure sealing. The permeable layer 25 is preferably made from a perforated PE web. It is noted, however, that the packaging 20 may be made from glass or a metal, with the microbial oxygen absorber layer 24 applied on the inwardly facing surface thereof. The foil 28 may also be defined by a layered material having properties identical or similar to layered material 22'. In one embodiment, the packaging 20 may have regions, such as the sides 21 of the upper part 22, where no microbial oxygen absorber is provided.

In the embodiment shown in FIG. 1a, the upper part 22 is made to retain a shape where a relatively large headspace 15 is defined between the food product 10 and the upper part 22; the upper part 22 may, however, be shaped such that the food product 10 fits lightly therein.

It is noted that the layered material 22' with the microbial oxygen absorber is preferably manufactured well in advance of the making of the packaging 20; however, in some cases, such as when the lifetime or activity of the microbiological oxygen absorbing material layer 24 is short or critical, it may be preferred to make the layered material 22' immediately prior to the time when the packaging 20 is sealed by the foil 28, thereby reducing the period of time where the material layer 24 is exposed to atmospheric air.

Figure 1B:
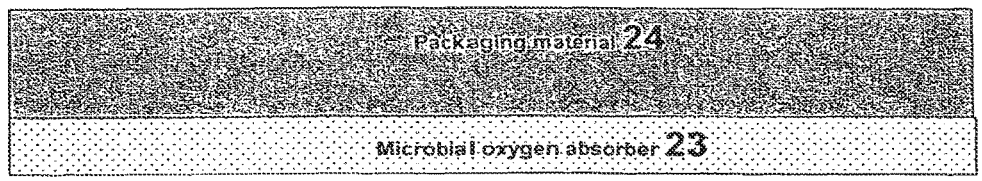
FIG. 1*b* is a schematic illustration of the microbial oxygen absorber being sprayed on the surface of the packaging material facing the food.

The layered material 22' may alternatively be formed without the permeable layer 25 where no protection or control of the activity of the microbiological oxygen absorbing layer 24 is required. FIG. 1b shows one such example where layered material 22' comprises an upper layer 23 as described above and carrying a layer of a microbial oxygen absorber sprayed or otherwise applied to the layer 23. Such a layered material 22' for the upper part 22 may be manufactured right before the upper part 22 is shaped such as by injection moulding or deep-drawing.

In the above, the packaging 20 has been described above as providing a well-defined headspace 15 by the packaging 20 including a part 22 adapted to retain its shape under normal use. However, the use of a flexible packaging material including a microbiological oxygen absorbing material and wrapped around the food product 10 also falls within the general concept of the present invention.

Figure 1C:
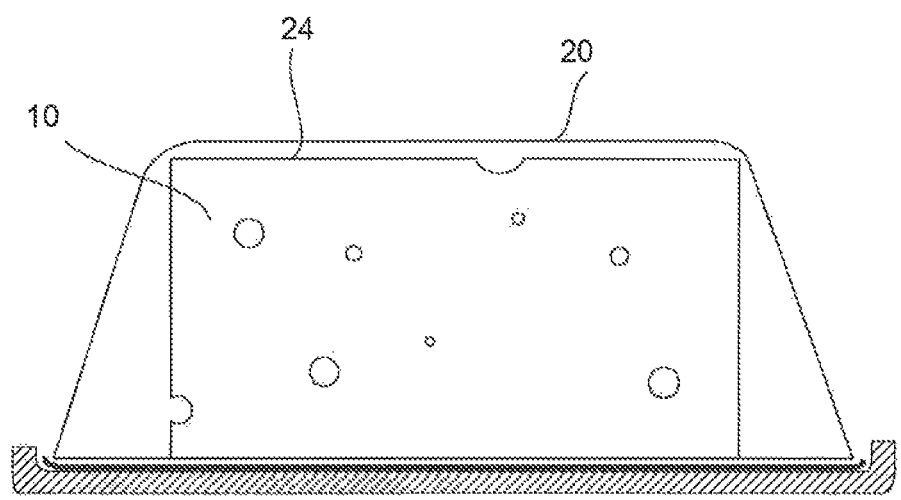
FIG. 1*c* shows an alternative application of a microbial oxygen absorber according to the invention.

FIG. 1c shows an alternative embodiment of the invention where a layer 24 of a microbiological oxygen absorbing material has been applied to the surface of the food product 10, the packaging 20 being made from any conventional gas-impermeable material adapted to prevent entry of air into the packaging 20. The microbial oxygen absorbing material may be applied by spraying a slurry thereof onto the food product 10 before or during packaging. Optionally the slurry may comprise one or more nutrients for the microbial oxygen absorber, e.g. a carbon and/or nitrogen-source. When the food is a cheese, the application of the microbial oxygen absorber onto the cheese may be followed by the application on the food product 10 of a semi air-impermeable coating, e.g. Dutch plastic coating, paraffin wax or other lipid-based coatings.

In yet another preferred embodiment (not shown) the microbial oxygen absorber may be applied to a separate sachet or label placed within packaging 20 of FIG. 1c, or the microbial oxygen absorber, preferably as freeze-dried powder pellets, may be introduced into the packaging 20 before sealing thereof. When in liquid form, the microbial oxygen absorber may be injected into the packaging 20 by perforating the packaging 20 and then resealing.

Food products 10 packaged according to conventional methods often perish rapidly due to oxygen present within the packaging, i.e. either in a headspace between the packaging and the food product or within the food product itself. Although the food products may be packaged in a vacuum or in a modified atmosphere, obtaining highly reduced low residual oxygen content in the packaging process is time-consuming and costly.

The use of a microbial oxygen absorber material as mentioned above allows for a reduction of the residual oxygen content by the microbial oxygen absorber ensuring that the oxygen concentration within the packaging 20 continuously decreases, preferably until depletion, following closure of the packaging 20. The invention is useful when the food product 10 is packaged in a vacuum or in a modified atmosphere and even when the food product 10 is packaged in atmospheric air.

In addition, a prolonged lifetime of the food product 10 may be ensured through the effect of the microbial oxygen absorber material after opening of the packaging 20 by the consumer where access of atmospheric air to the interior of the packaging is no longer restricted.

It is noted that, irrespectively of the packaging 20 selected for the food product 10, the microbial oxygen absorber discussed herein may be incorporated into the food product itself during the production process of the food product, for the purpose of providing a prolonged lifetime of the food product, thus allowing for the use of any conventional packaging.

The microbial oxygen absorber is preferably selected from microorganisms classified as GRAS microorganisms (Generally Recognised As Safe). Among microorganisms classified as GRAS are *Lactococcus* spp., *Streptococcus* spp., *Lactobacillus* spp., *Leucnostoc* spp., *Brevibacterium* spp., *Propionibacterium* spp., *Bifidobacterium* spp., *Saccharomyces* spp., and *Kluyveromyces* spp.

Many microorganisms use oxygen during their metabolism. Some, however, produce acids, alcohols, gases, and flavor compounds during this process, which may cause undesirable sensory and physical changes in the foods. In one embodiment of the invention the microbial oxygen absorber uses oxygen without subsequently reducing pH or producing significant amounts of gases. In another embodiment the microbial oxygen absorber is a microorganism that also produces a change in the flavour of the food product. This change of flavour of the food product may be desirable for some applications, e.g. in relation to some dairy products.

In another embodiment of the invention the microbial oxygen absorber is selected from oxygen absorbing strains of *Lactococcus* spp., *Streptococcus* spp., *Lactobacillus* spp., *Leucnostoc* spp., *Brevibacterium* spp., *Propionibacterium* spp., *Bifidobacterium* spp. and yeast spp. In their natural form these species may not absorb oxygen fast enough and at low concentrations of oxygen as desired when using them as microbial oxygen absorbers according to the present invention. The oxygen consumption rate of microorganisms may be improved by changing the microorganisms by either cultural modifications, modification by introducing mutations or by other genetic modifications.

The first option is to manufacture the microorganisms under conditions where they acquire or improve their ability to absorb (metabolize) oxygen. One way to accomplish this is to manufacture the microorganisms in a medium containing porphyrin, e.g. as haemin. Microorganisms may in this way be "loaded" with a porphyrin compound, allowing microorganisms which do not naturally contain porphyrin compounds or which contain insufficient porphyrin compounds, e.g. *Lactococcus*, to absorb oxygen. Reference is made to WO 01/52668 wherein a strain of *Lactococcus lactis* subsp. *lactis* (DSM 12015) was cultured in a medium containing haemin, thus resulting in bacteria containing at least 0.1 ppm on a dry matter basis of a porphyrin compound.

Another option for modifying a microorganism such as a lactic acid bacterium, is to introduce one or more mutations causing a shift in the metabolism such that the oxygen absorption by metabolism is increased. In one embodiment a lactic acid bacterium is Ldh defective, Lch$^-$, i.e. a mutation has been introduced which causes a defective lactate dehydrogene activity. Ldh$^-$ strains cannot regenerate NAD$^+$ from NADH by reducing pyruvate to lactic acid, and these strains must rely on other reactions for regenerating NAD$^+$, e.g. NADH oxidase encoded by the nox gene. Regeneration of NAD+ by NADH oxidase causes the concomitant consumption of oxygen. Thus, in yet another embodiment the microbial oxygen absorber is a lactic acid bacterium having Ldh$^-$ phenotype and overexpressing NADH oxidase. In yet another embodiment, the microbial oxygen absorber is a lactic acid bacterium having Ldh$^-$ and Pfl$^-$ phenotype, i.e. being defective in both lactate dehydrogenase and in pyruvate formate lyase activities. Methods for producing such Ldh$^-$ strains are disclosed in WO 98/54337, EP 0937774 and EP 0928333. These documents also disclose assays suitable for quantification of the oxygen consumption rate by these microorganism. Typically, a liquid such as skimmed milk at 30° C. is inoculated with an appropriate amount of microorganisms, e.g. 10$^7$ CFU/mL, and the oxygen concentration in the liquid is measured over time.

In yet another embodiment the microbial oxygen absorber is *Lactococcus lactis*. In yet another embodiment the microbial oxygen absorber is a *Lactococcus lactis*, which consumes oxygen and does not produce lactic acid. In yet another embodiment the microbial oxygen absorber is a *Lactococcus lactis* strain which is Ldh$^-$, e.g. DN-224 (DSM 11037). In yet another embodiment the microbial oxygen absorber is a *Lactococcus lactis* strain which is Ldh$^-$ and Pfl$^-$, e.g. DN-223 (DSM 11036). In yet another embodiment the microbial oxygen absorber is a *Lactococcus lactis* strain which is Ldh$^-$ and overexpresses NADH oxidase.

In other embodiments the microbial oxygen absorber does not produce significant amounts of organic acids and carbon dioxide. In yet another embodiment the microbial oxygen absorber is *Lactococcus lactis* subsp. *diacetylactis*. In yet another embodiment the microbial oxygen absorber is a *Lactococcus lactis* subsp. *diacetylactis* strain which is Ldh$^+$. In yet another embodiment the microbial oxygen absorber is a *Lactococcus lactis* subsp. *diacetylactis* which is Ldh$^-$ and Pfl$^-$. In yet another embodiment the microbial oxygen absorber is a *Lactococcus lactis* subsp. *diacetylactis* strain which is Ldh$^-$ and overexpresses NADH oxidase.

In another embodiment of the invention the microbial oxygen absorber is able to lower the concentration of oxygen in skimmed milk at 30° C. from about 8 mg/kg to less than 1 mg/kg in less than 3 hours after inoculating the skimmed milk with 10$^6$ CFU/mL of the microbial oxygen absorber.

In another embodiment of the invention the microbial oxygen absorber is able to lower the concentration of oxygen in a solution of 0.1% peptone, 0.85% NaCl and 3% lactose at 30° C. from about 8 mg/kg to less than 1 mg/kg in less than 3 hours after inoculating the skimmed milk with 10$^6$ CFU/mL of the microbial oxygen absorber.

A wide variety of food products may be preserved according to the present invention. Dairy products, such as cheese, are particularly preferred. In one embodiment of the invention the food product is selected from the group consisting of a sliced meat product, a ready meal incl. a sous-vide product, or a bakery product.

The present invention is further illustrated by the following examples, which, however, are not to be construed as limiting the scope of protection. The features disclosed in the foregoing description and in the following examples may, both separately or in any combination thereof, be material for realising the invention in diverse forms thereof.

REFERENCES

L. Vermeiren, F. Devlieghere, M. van Best, N de Kruijf, J. Debevere. 1999. Developments in the active packaging of foods. Trends in Food Science & Technology 10: 77-86.

L. Vermeiren, F. Heirlings, F. Devlieghere, J. Debevere. 2003. Oxygen, ethylene and other scavengers. In: R. Ahvenainen (Ed.) Novel Food Packaging Techniques. Woodhead Publishing, Cambridge, pp. 22-49.

EXAMPLES

Example 1

The aim was to evaluate the effect of the microbial oxygen absorber on low-fat and high-fat cheeses.

The microbial oxygen absorber *Lactococcus lactis* was obtained from Chr. Hansen (F-DVS DN-224, deposited under accession number DSM 11037). The following growth media containing lactose and protease peptone were produced:

0.25% Lactose:
1.0 g peptone
8.5 g NaCl
2.5 g lactose
1000 mL demineralized water
0.50% Lactose:
1.0 g peptone
8.5 g NaCl
5.0 g lactose
1000 mL demineralized water 0.75% Lactose:
1.0 g peptone
8.5 g NaCl
7.5 g lactose
1000 mL demineralized water The growth media were autoclaved, cooled to 30° C., and 100 g of F-DVS DN-224 was added. This gave a $10^8$ cfu/mL concentration of bacteria.

Two types of cheese were evaluated: A low-fat semi-hard cheese (5% fat in dry matter) and a high-fat semi-hard cheese (60% fat in dry matter). The products were sliced, and the surface sprayed with the bacteria slurry. The cheeses were subsequently packaged in a commercial packaging made of APET/PE and with a lid consisting of OPA/PE. A modified atmosphere containing 30-33% $CO_2$ and max 0.5% $O_2$, and with $N_2$ as fill gas was used. The products were stored at 5° C. in the dark until time of sampling.

The products were evaluated after 9, 11, 13 and 15 weeks for the low-fat cheese and after 15, 17, 19, and 21 weeks with respect to the high-fat cheese. The following evaluations were performed: Gas content ($O_2$ and $CO_2$) and sensory evaluations. Furthermore, pH, peptide mapping, and volatile aroma compounds were evaluated after 13 and 15 weeks for low-fat cheese and after 19 and 21 weeks with respect to high-fat cheese.

The results are listed in Table 1. For clarity, only results after 13 and 15 weeks for low-fat cheeses and results after 19 and 21 weeks with respect to the high-fat cheese are listed. The entire test battery was applied at these times of withdrawal.

The microbial oxygen absorber *Lactococcus lactis* was obtained from Chr. Hansen (F-DVS DN-224). The following growth medium containing lactose and protease peptone was produced:

3% Lactose:
1.0 g peptone
8.5 g NaCl
30 g lactose
1000 mL demineralized water

The growth medium was autoclaved, cooled to 20° C., and 10 g of F-DVS DN-224 was added. This gave a $47 \times 10^7$ cfu/mL concentration of bacteria. A reference containing only the peptone solution was used for comparison.

40 mL 3% lactose/peptone water or peptone water with/without the microbial oxygen absorber were placed in a tray consisting of APET/PE and with a lid consisting of OPA/PE. Three packaging gas combinations were applied targeting at the following residual oxygen concentrations: 0.3%, 1%, and 21% (atmospheric air). $CO_2$ was constant at approx. 25% for the reduced oxygen gases and approx. 0% for the atmospheric air. $N_2$ was used as a fill gas.

The packages were stored at 9° C. and 20° C. for 0, 7, 12, and 20 days.

Figure 2:
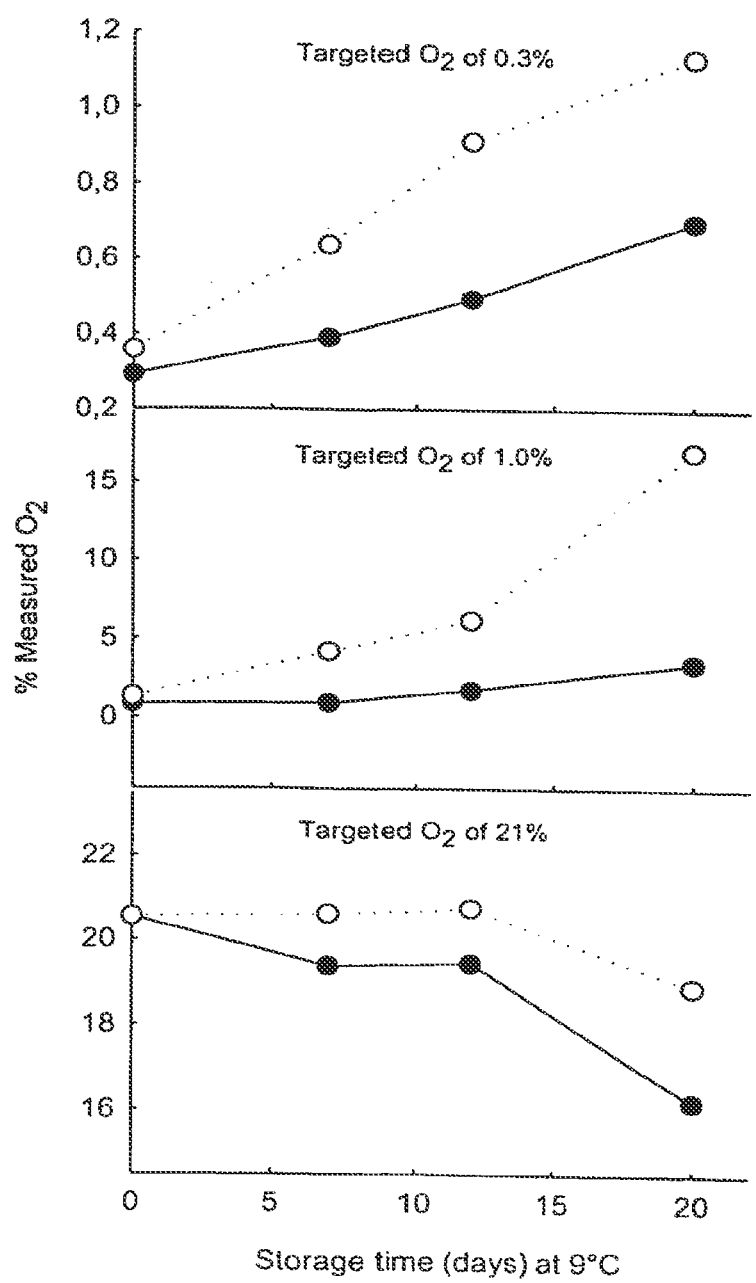
FIG. 2 shows the measured oxygen content in samples stored 0-20 days at 9° C. Dotted lines with white dots are samples without the microbial oxygen absorber. Solid lines with black dots are samples with the microbial oxygen absorber. Triple determinations. Consecutive measurements were performed on the same package throughout the experiment.
Figure 3:
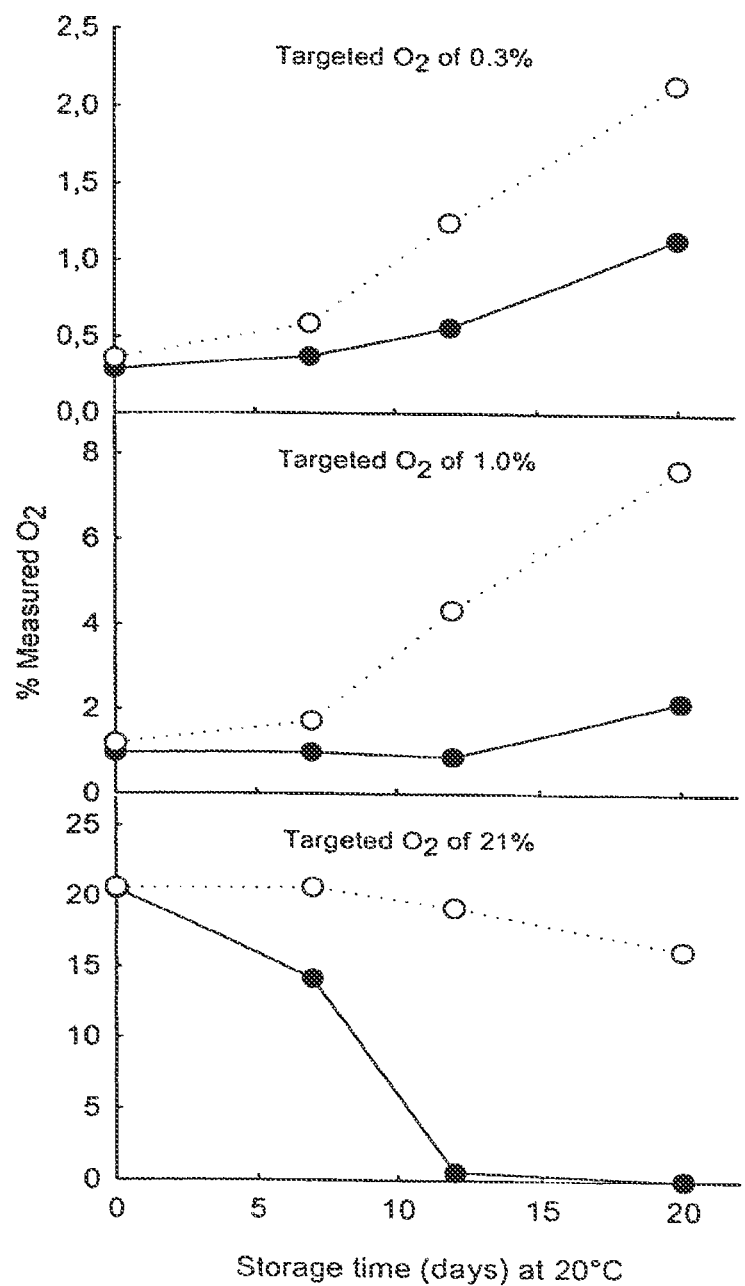
FIG. 3 shows measured oxygen content in samples stored 0-20 days at 20° C. Dotted lines with white dots are samples without the microbial oxygen absorber. Solid lines with black dots are samples with the microbial oxygen absorber. Triple determinations. Consecutive measurements were performed on the same package throughout the experiment.

At time of sampling, gas content ($O_2$ and $CO_2$) and growth of *Lactococcus lactis* (M17 agar) were measured. Lactose content and pH were measured at the beginning and end of the experiment. Consecutive measurements were performed on the same package throughout the experiment. The results were averaged and based on triplicate determinations. The results of the oxygen measurements are listed in FIGS. 2 and 3.

TABLE 1

Effect of the use of a microbial oxygen absorber on physical, chemical, and sensory properties of semi-hard low-fat and high-fat cheeses.

| Product | Microbial $O_2$ absorber | Storage time (weeks) | $O_2$ (Note 1) | $CO_2$ (Note 1) | pH | Diacetyl "ppm" | Peptide mapping | Sensory evaluations |
|---|---|---|---|---|---|---|---|---|
| Low-fat cheese | − | 13 | 0.021 | 20.2 | 5.60 | 0.457 | Differences in peptide profiles of 13 and 15 weeks cheeses are noted | Flavor and odor were improved when using the microbial $O_2$ absorber |
| | + | 13 | 0.013 | 20.3 | 5.53 | 0.625 | | |
| | − | 15 | 0.019 | 20.2 | 5.53 | 0.556 | | Flavor end odor were improved when using the microbial $O_2$ absorber |
| | + | 15 | 0.005 | 21.4 | 5.53 | 0.727 | No differences in peptide profiles of products with end without microbial absorber were found | |
| High-fat cheese | − | 19 | 0.050 | 17.2 | 5.13 | 1.039 | Difference in peptide profiles of 19 and 21 weeks cheeses were noted | Flavor was improved when using the microbial $O_2$ absorber in combination with high lactose concentrations. No explicit differences in odor was noted |
| | + | 19 | 0.020 | 20.7 | 5.19 | 0.945 | | |
| | − | 21 | 0.040 | 19.1 | 5.10 | 0.674 | Slight differences in profiles of products with and without microbial absorber were noted | Odor was improved when using the microbial $O_2$ absorber. No pronounced differences in flavor were noted |
| | + | 21 | 0.029 | 19.0 | 5.11 | 0.952 | | |

Note 1:
Only 0.75% lactose results. Same trend was noted for the two other lactose concentrations.

No effect of the microbial oxygen absorber on pH was noted in either low-fat cheese or high-fat cheeses. The absorber may have a slight effect on the ripening of high-fat cheeses. Increased levels of diacetyl and acetoin (exemplified by diacetyl in Table 1) were noted in the cheeses. These compounds have a positive effect on the flavor of dairy products. Simple sensory evaluations revealed a positive effect of the microbial oxygen absorber.

Example 2

The aim was to evaluate the effect of the microbial oxygen absorber at different residual oxygen levels.

The microbial oxygen absorber reduced the oxygen level compared to a control without the microbial oxygen absorber. This effect was noted both at 9° C. and 20° C.

Example 3

Product tests with the microbial oxygen absorber and Cheddar cheese have been performed.

The aim was to evaluate the effect of the microbial oxygen absorber at different residual oxygen levels, and with and without inoculation *Penicillium camemberti*.

The microbial oxygen absorber *Lactococcus lactis* was obtained from Chr. Hansen (F-DVS DN-224). The following growth medium containing lactose and protease peptone was produced:

3% Lactose:

1.0 g peptone 8.5 g NaCl 30 g lactose 1000 mL demineralized water

The growth medium was autoclaved, cooled to 20° C., and 0.5 g of F-DVS DN-224 was added. This gave a $27 \times 10^6$ cfu/mL concentration of bacteria. A reference containing only the lactose/peptone solution was used for comparison.

The *Penicillium camemberti* strain was located at Kvibille Dairy and grown on DYES (dichloran yeast extract sucrose) agar. The spores were resuspended in sterilized water to obtain a $10^6$ spores/mL solution. The *Penicillium camemberti* solution had a concentration of $12 \times 10^5$ spores/mL.

40 mL 3% lactose/peptone water with/without the microbial oxygen absorber were placed in a tray consisting of APET/PE and with a lid consisting of OPA/PE. Cheddar chunks weighing approx. 100 g were dipped in paraffin and dried. The Cheddar was placed in the tray, and half of the samples were inoculated with 10 μl of the *Penicillium camemberti* suspension.

Three packaging gas combinations were applied targeting at the following residual oxygen concentrations: 0.3%, 1%, and 21% (atmospheric air). $CO_2$ was constant at approx 25% for the reduced oxygen gases and approx. 0% for the atmospheric air. $N_2$ was used as a fill gas.

The packages were stored at 9° C. and 20° C. for 0, 5, 10, and 20 days.

At time of sampling, gas content ($O_2$ and $CO_2$) and growth of *Lactococcus lactis* (M17 agar) were measured. Lactose content and pH were measured at the beginning and end of the experiment. Consecutive measurements were performed on the same package throughout the experiment. The results were averaged and based on duplicate determinations.

In samples only containing the microbial oxygen absorber, i.e. without the *Penicillium camemberti* inoculation, a clear effect of the presence of the absorber on the residual oxygen content was noted. When comparing the samples with both the microbial absorber and *Penicillium camemberti*, it appeared that the mold apparently used the oxygen present and that the oxygen levels were significantly reduced in the products containing both the microbial oxygen absorber and the *Penicillium camemberti* as compared to samples only containing the microbial oxygen absorber.

Example 4

The aim of the experiment is to evaluate the effect of the microbial absorber on quality changes caused by light exposure.

Different residual oxygen levels are tested (between 0-5%). The cheeses are packaged in commercial packaging materials, the microbial oxygen absorber is sprayed on the cheese surfaces, and subsequently, the cheeses are packaged in modified atmospheres and stored at chilled temperatures in the dark or exposed to light (resembling retail exposure conditions). At time of withdrawal, gas content ($O_2$ and $CO_2$) is evaluated, and relevant physico-chemical, microbial, and sensory evaluations are carried out.

Example 5

The aim of the experiment is to optimize the microbial oxygen absorber system.

The following parameters are evaluated:
Different growth substrates (milk, peptone water, milk hydrolysates and water)
Different growth temperatures (5° C., 9° C., and 20° C.)
Optimal concentration of microbial absorber material (inoculation percentage)
Method of application.

Example 6

The aim of the experiment is to evaluate the optimal combination of microbial oxygen absorber concentration and residual oxygen content, which may subsequently result in increasing packaging machine speeds. The experiment involves spraying techniques and evaluations of different oxygen concentrations. (e.g. 0.1, 0.3, 1, and 5% $O_2$). Finally, up scaling experiments with different dairy products take place. Other food products are also included in the evaluations.

Example 7

Delite 5% sliced cheese is placed in plastic trays and *Lactococcus lactis* subsp *lactis* DN224 in a lactose/peptone solution is sprayed onto the cheese.

The plastic trays are packaged with a gas having the following composition: 0.4% $O_2$ og 43.5% $CO_2$.

The $O_2$ and $CO_2$ concentrations in the head space of the packaged cheese are measured after packaging as well as after the experiment.

The following materials are used:
Nr. Vium trays (GL440, 400 mu APET/4O mu PE) and lids (15 mu OPA/40 mu PE)
Delite 5% sliced cheese from Nr. Vium dairy.
Gas composition used for packaging: 43.5% carbon dioxide nd 04% oxygen.
The lactose/peptione solution contains

| | |
|---|---|
| NaCl | 8.5 g |
| Peptone | 1.0 g |
| Lactose | 30.0 g |
| Water | 1 Litre |

Autoclaved at 121° C. for 45 minutes

The cheese is inoculated with the following amount of *Lactococcus lactic* DN-224:
10 g frozen *Lc. lactis* culture is added per liter of lactose/peptone solution. Each cheese for packaging in a plastic tray is added 1 mL of the lactose/peptone by spraying.

The plastic trays are packaged (sealed) using a Multivac T200 from Multivac.

The packaged cheeses are incubated at 20° C. and at 9° C.

The following packaged cheese products are prepared:
1. 9 trays with cheese, *Lc. lactis* and lactose/peptone solution.
2. 9 trays with cheese and lactose/peptone solution
3. 9 trays with cheese and sterile water.
4. 9 trays with *Lc. Lactis* and lactose/peptone solution.
5. 9 trays with lactose/peptone solution.

The invention claimed is:

1. A method for the preservation of a food product by packaging the food product in a consumer package comprising a packaging material and a microbial oxygen absorber,
   wherein the microbial oxygen absorber shows increased oxygen consumption due to cultural or genetic modifications compared to strains before the modifications, such that the microbial oxygen absorber prolongs the shelf life of the food product by actively lowering the oxygen concentration in the consumer package, and
   wherein the microbial oxygen absorber functions to lower oxygen concentration in the consumer package even after the consumer package is opened and subsequently resealed, and
   wherein said microbial oxygen absorber is selected from *Lactococcus lactis* subsp. *lactis* DN224 deposited as DSM 11037, *Lactococcus lactis* subsp. *lactis* DN223 deposited as DSM 11036, a strain of *Lactococcus lactis* subsp. *Lactis*, and *Lactococcus lactis* subsp. *Diacetylactis*, and
   wherein the microbial oxygen absorber is applied by spraying a slurry containing the microbial oxygen absorber onto the food product or onto the packaging material or incorporated in the packaging material
   wherein said microbial oxygen absorber uses oxygen without subsequently reducing pH.

2. The method according to claim 1, wherein the packaging material is a material defining a barrier adapted to prevent or to minimize entry of air into the packaging.

3. The method according to claim 1, wherein the microbial oxygen absorber is applied to the surface of the food product or incorporated in the packaging material.

4. The method according to claim 3, wherein the microbial oxygen absorber is applied in an amount from $10^2$ $CFU/cm^2$ to $10^7$ $CFU/cm^2$.

5. The method according to claim 4, wherein the microbial oxygen absorber is applied in an amount from $10^3$ $CFU/cm^2$ to $10^6$ $CFU/cm^2$.

6. The method according to claim 4, wherein the microbial oxygen absorber is applied in an amount from $10^4$ $CFU/cm^2$ to $10^5$ $CFU/cm^2$.

7. The method according to claim 1, wherein the slurry comprises one or more nutrients for the microbial oxygen absorber.

8. The method according to claim 7, wherein the nutrient is a carbon and/or nitrogen-source.

9. The method according to claim 1, wherein the microbial oxygen absorber is applied to a sachet, label, capsule, or as freeze-dried powder pellets placed in a space between the food product and the packaging material.

10. The method according to claim 1, wherein said microbial oxygen absorber have the phenotype Ldh– or overexpresses NADH oxidase.

* * * * *